United States Patent [19]

Reisman et al.

[11] 4,314,449
[45] Feb. 9, 1982

[54] NON-CONTACTING THERMAL ENERGY TRANSFER ASSEMBLY

[75] Inventors: Elias Reisman, Orange; David S. Goodsell; Fred S. Masino, both of Costa Mesa, all of Calif.

[73] Assignee: Ford Aerospace & Communications Corp., Dearborn, Mich.

[21] Appl. No.: 179,927

[22] Filed: Aug. 20, 1980

Related U.S. Application Data

[62] Division of Ser. No. 966,972, Dec. 6, 1978.

[51] Int. Cl.³ .............................................. F25B 21/02
[52] U.S. Cl. ................................................................ 62/3
[58] Field of Search ..................... 62/3, 467; 250/503; 165/504, 10, 80 B, 80 C, 96, 185

[56] References Cited

U.S. PATENT DOCUMENTS

| | | | |
|---|---|---|---|
| 2,712,236 | 7/1955 | Bennett et al. | 73/351 |
| 3,103,587 | 9/1963 | Ure, Jr. et al. | 250/83.3 |
| 3,253,423 | 5/1966 | Sonnabend | 62/467 X |
| 3,369,597 | 2/1968 | Dronsuth et al. | 165/80 B |
| 3,422,886 | 1/1969 | Buller | 62/467 X |
| 3,738,422 | 6/1973 | Economos et al. | 165/185 |
| 3,813,518 | 5/1974 | Arita | 219/471 |
| 3,994,277 | 11/1976 | Altman | 126/270 |
| 4,008,395 | 2/1977 | Ellis | 250/352 |
| 4,030,316 | 6/1977 | Aronson | 62/467 R |
| 4,079,595 | 3/1978 | Kroebig | 62/467 R |
| 4,087,061 | 5/1978 | Burt | 244/3.16 |
| 4,112,699 | 9/1978 | Hudson et al. | 62/3 |
| 4,121,434 | 10/1978 | Annable | 62/467 R |
| 4,150,552 | 4/1979 | Altman | 62/467 R |

Primary Examiner—Lloyd L. King
Attorney, Agent, or Firm—Paul K., Godwin, Jr.; Clifford L. Sadler

[57] ABSTRACT

A thermal conducting path between a relatively movable heat source and a relatively fixed heat sink element, defined as a relatively narrow non-contacting conducting gap between opposing conducting surfaces. In an embodiment where the heat source is gimbal mounted, for movement with respect to two orthogonal axes, its conductive surface has a convex partial spherical shape while the relatively fixed surface of the heat sink element has a concave partial spherical shape. In order to maintain a constant gap, the opposing surfaces have a common spherical center located at the crossover of said orthogonal axes and the spherical radii dimensions differ by the distance of said relatively narrow non-contacting gap therebetween.

5 Claims, 2 Drawing Figures

NON-CONTACTING THERMAL ENERGY TRANSFER ASSEMBLY

LICENSE RIGHTS

The U.S. government has a paid-up license in this invention and the right, in limited circumstances, to require the patent owner to license others on reasonable terms as provided for by the terms of contract number FO8635-76-C-0002 awarded by the U.S. Air Force.

This application is a division of application Ser. No. 966,972, filed Dec. 6, 1978.

CROSS REFERENCE TO RELATED APPLICATION

This invention is related to commonly assigned U.S. patent application Ser. No. 934,439, filed Aug. 17, 1978, and entitled THERMAL ENERGY SWITCH, now U.S. Pat. No. 4,270,603.

BACKGROUND OF THE INVENTION

1. Field of the Invention

The present invention relates to the area of improved heat transfer. More specifically, the present invention relates to a technique for providing a low resistance thermal energy conduction path between two relatively movable elements.

2. Description of the Prior Art

Gimbal mounted detectors have been found in the prior art which are movable either with a commonly gimballed optical system or movable with respect to a fixed optical system. However, efficient detector cooling was not known for those detectors.

Thermoelectric type cooling systems have been widely employed in radiant energy detectors to maintain the energy detection elements at relatively low temperatures and constant sensitivity. However, in those systems, the detecting elements were generally mounted on non-movable heads and associated with flexible optic systems. Flexible optic systems generally comprised movable relay mirrors, that provided necessary focusing and directing of selected or scanned images onto the relatively fixed detectors. Furthermore, conventional thermoelectric cooling systems required direct mechanical connections of the detecting elements to their associated heat sinks, in order to provide thermally efficient cooling paths for heat generated at the detecting elements.

SUMMARY OF THE INVENTION

The present invention allows for a movable detector element to be efficiently cooled by providing a non-contacting thermal energy path between a relatively movable heat source and a relatively fixed heat sink.

The invention is based upon a discovery that fluid gases, such as air, nitrogen, etc., have certain thermal resistivity characteristics, over small distances, resembling efficient thermal conductors. This is in contrast to the conventional notion that those gases act as thermal insulators.

The invention is described herein as being embodied in a gimballed detector assembly to provide a low resistance thermal energy path from a heat source to a heat sink. In that embodiment, an optical lens system, a detecting element and a thermoelectric cooler are commonly mounted in a head, which is movable about two orthogonal axes. The hot side of the thermoelectric cooler is directly connected to a conducting surface having a convex partial spherical shape. A relatively fixed heat sink is directly connected to a conducting surface having a concave partial spherical shape corresponding to the movable surface. The two opposing surfaces are concentric and appear to form a ball and socket connection. However, a small gap is maintained between the two surfaces, providing a non-contacting low resistance thermal energy path therebetween.

It is an object of the present invention to provide a thermal energy conducting assembly between a relatively movable heat source and a relatively fixed heat sink.

It is another object of the present invention to provide a gimballed detector/thermoelectric cooler assembly having a high efficiency that allows the detector to maintain a constant focus position in a commonly gimballed optical system.

DESCRIPTION OF THE PREFERRED EMBODIMENT

During the course of constructing the embodiment of a thermal switch as shown in the above-related U.S. Pat. application Ser. No. 934,439, it was necessary to determine the thermal insulative qualities of air and other gases. Measurements were made by constructing a test jig and monitoring temperature drops across various dimensional air gaps between two heat conducting surfaces. The results of those measurements for air are shown in FIG. 1 and were used to determine dimensional movement requirements and to set standards for ordering bimetallic discs employed in the thermal switch.

Figure 1:
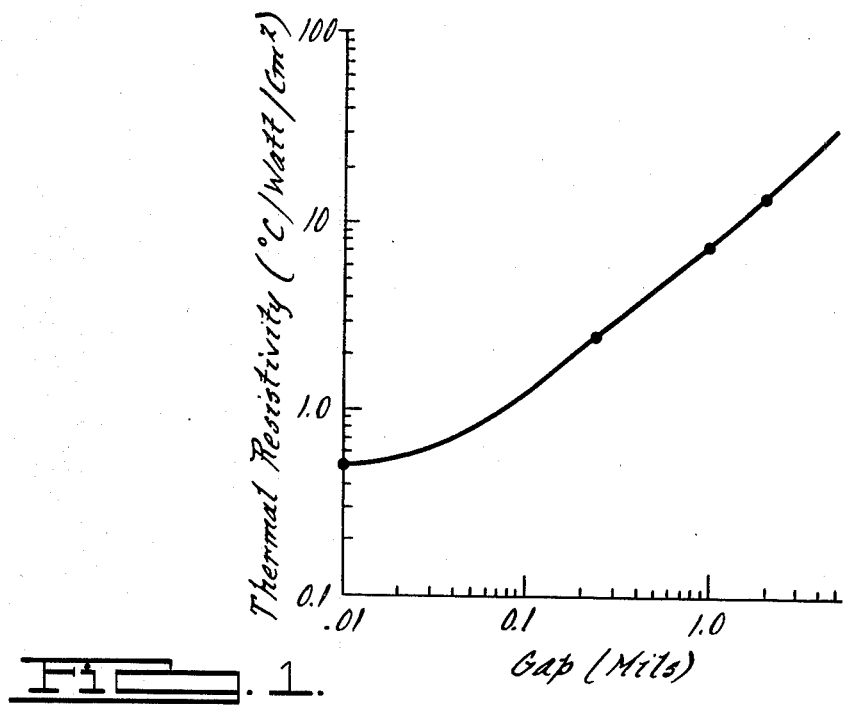
FIG. 1 is a plot of thermal resistivity as a function of gap size for air.

FIG. 1 plot also revealed that, for gaps up to approximately 1 mil, the thermal resistivity (°C./watt/cm$^2$) is less than 10° C. Such thermal resistivity compares favorably with the conventional heat path for a non-gimballed thermoelectric cooling system described above with respect to the prior art. Conventional thermal resistivity is on the order of 14° C. in a typical system with 2 watts carried between the heat source and the heat sink.

Figure 2:
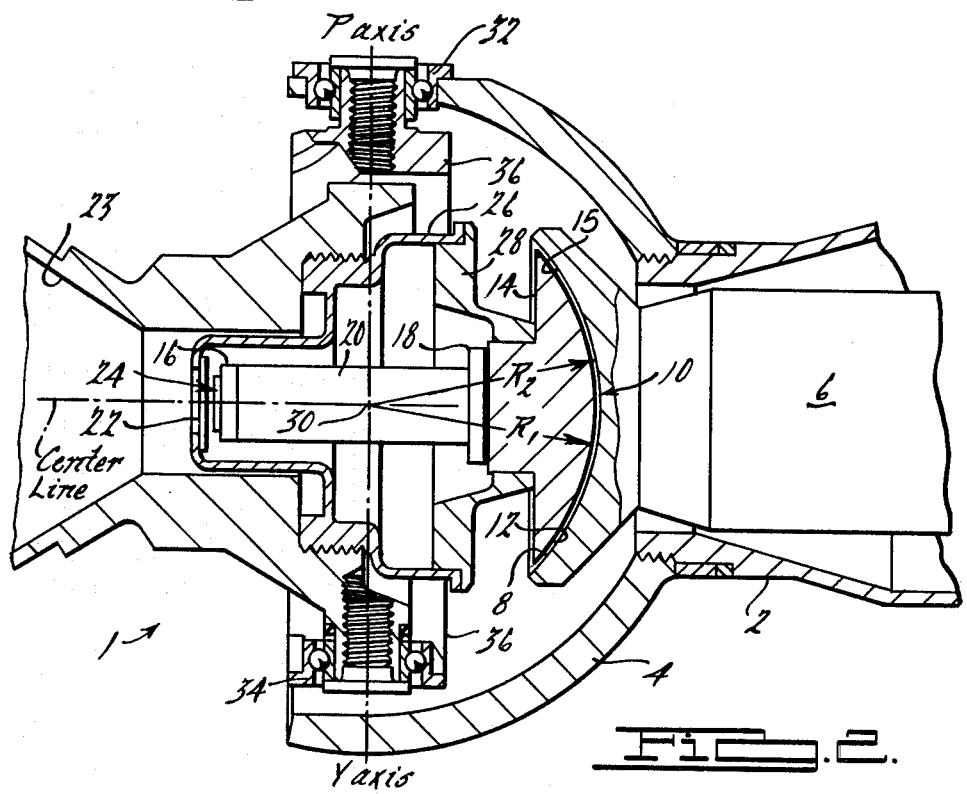
FIG. 2 is a revolved cross section partially showing two orthogonal axes projections of a detector assembly employing the present invention.

The embodiment, for which the present invention is found to be well suited, is shown in FIG. 2, where a gimballed detector assembly 1 is detailed.

The detector assembly 1 is of the type generally suited for use in missiles or other movable vehicles where it is desired to detect radiant energy from a remote source. In this instance, an outer housing ring 4 is mounted on a relatively fixed mounting 2. The outer housing ring 4 contains a set of bearings 32 (one of the set is not shown), which support an inner gimbal ring 36 for rotation about the pitch axis "P". The inner gimbal ring 36 contains a set of ball bearings 34 (one of the set is not shown) which support the detector assembly for rotation about the yaw axis "Y", orthogonal to the "P" axis.

FIG. 2 illustrates the embodiment of the invention in orthogonal cross-section, wherein the top half of FIG. 2 is a sectional view parallel to the Y axis and bottom half is a sectional view parallel to the P axis. Therefore, although the Y and P axes appear as a single line in FIG. 2, it should be realized that in the embodiment they are in fact orthogonal axes which intersect at a point 30.

The detector assembly 1 is mounted on the inner gimbal ring 36, within a detector housing 26 which is attached to a radiation shield 23. The detector housing 26 includes a window 22 which is transparent to the particular wavelength of radiation to be detected, such as infrared. A detector element 24, such as an infrared detector, is mounted so as to receive radiant energy from a remote source through the window 22 and a commonly gimballed lens system (not shown). In order to maintain the sensitivity of the infrared detector element 24, a cooling element 20 serves to extract heat therefrom. In this embodiment, a thermoelectric cooling element 20, having a cold electrode 16 and a hot electrode 18, serves to extract heat from the detector element 24 and transfer that heat from the cold electrode 16 to the hot electrode 18. The hot electrode 18 is mounted on a low thermal resistivity element 14 and is in intimate contact therewith. Support members 28 serve to provide a rigid connection between the low thermal resistivity element 14 and the detector housing 26. The low resistivity element 14 has a first convex partial spherical surface 12 with its spherical radius $R_1$ centered at point 30. Therefore, as the detector assembly 1 is moved about the gimballed axes, the surface 12 of the low resistivity element 14 will move so as to define part of the outer surface of a sphere.

A heat sink 6 is located within the relatively fixed housing 2 and may be of a conventional dissipative or eutectic storage type. The heat sink 6 serves to receive thermal energy extracted by the thermoelectric cooler 20 in the detector assembly 1. The energy is received from the low resistivity thermal element 14 via a similar low thermal resistivity element 15. The low thermal resistivity element 15 may be considered to be part of the heat sink 6 or a separate path member with negligible losses. The low thermal resistivity element 15 has a concave partial spherical surface 8 with a spherical radius $R_2$ centered at point 30. The partial spherical surface 8 is concentric with and opposing to the partial spherical surface 12 of the low resistivity thermal element 14. The radii $R_1$ and $R_2$ differ by an amount which defines a space 10. The space 10 is filled with a gaseous fluid material, such as air or nitrogen, and the distance thereacross should be close enough to provide that the thermal resistivity of the gaseous fluid material is less than 10° C./watts/cm$^2$.

Of course, the preferred embodiment discussed above is a great benefit to those involved in missile detector design since it eliminates the need for cumbersome relay mirrors and their associated mounting mechanisms in the receiving optical system, while at the same time providing efficient cooling of the detector.

It will be apparent that many modifications and variations may be effected without departing from the scope of the novel concept of this invention. Therefore, it is intended by the appended claims to cover all those modifications and variations which fall within the spirit and scope of the invention.

What is claimed is:

1. A radiation detector assembly comprising:
a relatively fixed body;
a thermoelectric cooler having defined hot and cold conductors;
a gimbal assembly attached to said fixed body for mounting said thermoelectric cooler and detector element to provide relative movement about two orthogonal axes;
a heat sink mounted within said relatively fixed body;
means for transferring heat from said relatively movable hot conductor to said heat sink, which includes:
a first low thermal resistivity element mounted on said hot conductor;
a second low thermal resistivity element mounted within said body in contact with said heat sink; and
a gaseous fluid medium having a low thermal resistivity located between said first and second elements to provide a non-contacting thermal conducting path therebetween.

2. An assembly as in claim 1, wherein said medium is air and said first and second elements are separated by a continuously spaced gap of approximately 1 mil. (0.0254 mm).

3. An assembly as in claim 1, wherein said medium has a thermal resistivity below 10° C./watt/cm$^2$ between said first and second elements.

4. An assembly as in claim 1, wherein said first element has a convex partial spherical surface of a first radius having its spherical center located at the intersection of said orthogonal axes, said second element has a concave partial spherical surface of a second radius which is greater than said first radius to define a continuous space therebetween and said gaseous fluid medium occupies said space.

5. An assembly as in claim 4, wherein said medium has a thermal resistivity below 10° C./watt/cm$^2$ in said continuous space.

* * * * *